United States Patent [19]

Herlache

[11] Patent Number: 5,788,917

[45] Date of Patent: Aug. 4, 1998

[54] METHOD OF MAKING A PLASTIC ARTICLE

[75] Inventor: Russell Lee Herlache, Saginaw, Mich.

[73] Assignee: General Motors Corporation, Detroit, Mich.

[21] Appl. No.: 863,589

[22] Filed: May 27, 1997

[51] Int. Cl.[6] .................................................. B29C 45/00
[52] U.S. Cl. ........................................................ 264/572
[58] Field of Search ............................................ 264/572

[56] References Cited

U.S. PATENT DOCUMENTS

| | | | |
|---|---|---|---|
| 3,828,780 | 8/1974 | Morrison, Jr. | 128/275.1 |
| 5,076,778 | 12/1991 | Strunk et al. | 364/572 |
| 5,204,050 | 4/1993 | Loren | 264/504 |
| 5,225,141 | 7/1993 | Hendry | 264/572 |
| 5,256,047 | 10/1993 | Moldovanyi | 425/130 |
| 5,277,866 | 1/1994 | Wright | 264/572 |
| 5,324,189 | 6/1994 | Hendry | 425/533 |
| 5,354,518 | 10/1994 | Okada et al. | 264/1.25 |
| 5,384,444 | 1/1995 | Truty et al. | 219/69.12 |
| 5,389,314 | 2/1995 | Wang | 264/25 |
| 5,401,459 | 3/1995 | Nichols et al. | 264/572 |
| 5,482,669 | 1/1996 | Shah | 264/572 |
| 5,501,120 | 3/1996 | Kikuchi et al. | 74/543 |
| 5,620,639 | 4/1997 | Stevens et al. | 264/572 |
| 5,639,417 | 6/1997 | Kaneishi et al. | 264/572 |

FOREIGN PATENT DOCUMENTS

| | | | |
|---|---|---|---|
| 3-121820 | 5/1991 | Japan | 264/572 |
| 4-62118 | 2/1992 | Japan | 264/572 |

*Primary Examiner*—Catherine Timm
*Attorney, Agent, or Firm*—Saul Schwartz

[57] ABSTRACT

A method of making a plastic article having an internal conduit for electrical wires including the steps of forming a mold cavity in the shape of the plastic article having a surface area segment defining a passage in the mold cavity, injecting hot liquid plastic into the mold cavity which is quenched by the surface area segment of the mold cavity to form a solidified tubular wall in the passage having liquid plastic therein, injecting gas at the first site in the mold cavity into the liquid plastic in the tubular wall to expel liquid plastic from within the tubular wall so that an elongated gas-filled void is formed within the tubular wall, sustaining the elongated gas-filled void until all of the liquid plastic in the mold cavity solidifies, removing the plastic article from the mold cavity, and opening the elongated voids at opposite ends by drilling or otherwise machining the plastic article to convert the elongated void into an internal conduit for the electrical wires.

4 Claims, 3 Drawing Sheets

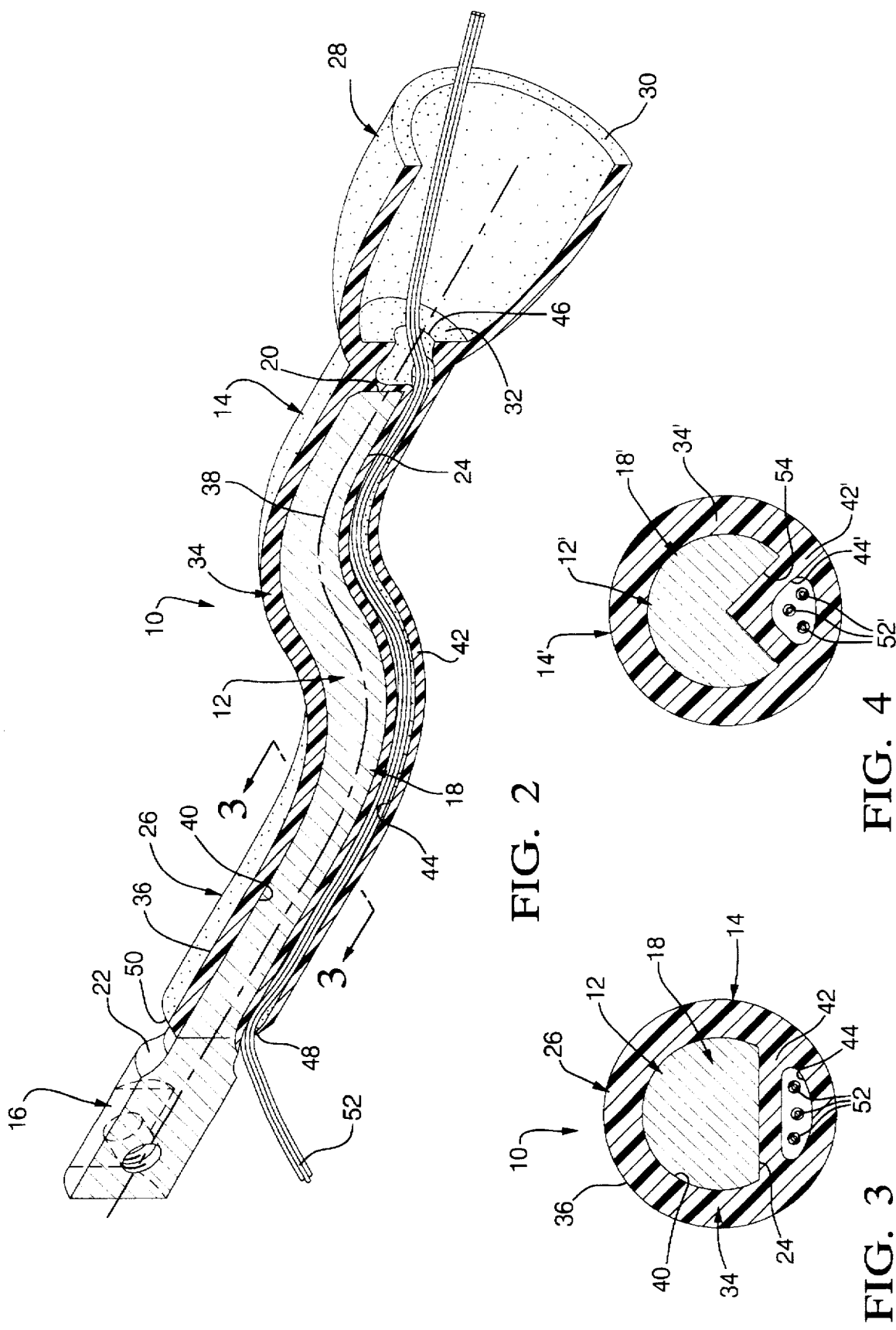

5,788,917

1

METHOD OF MAKING A PLASTIC ARTICLE

TECHNICAL FIELD

This invention relates to a method of making a plastic article having an internal conduit for electrical wires.

BACKGROUND OF THE INVENTION

A motor vehicle typically has a lever mounted on a steering column or on a floor console of the vehicle which an operator manipulates to, for example, change the operating range of a transmission of the motor vehicle. Such levers commonly consist of a rigid steel rod for structural integrity and a plastic hand grip molded on the steel rod for operator comfort and for aesthetics. For improved operator convenience, it is known to mold the plastic hand grip with a socket for an electrical switch which controls an accessory of the motor vehicle such as a cruise control or a windshield wiper motor. It is further known to route electrical wires which connect the switch in the socket in the hand grip to a wiring harness of the motor vehicle through an internal conduit of the lever formed by holes drilled through the plastic handle and through the steel rod. While such drilled holes are effective at concealing and routing the electrical wires, they are expensive to form. Also, where levers are bent to conform to available space in a motor vehicle, the drilled hole in the steel rod may be constricted by distortions which impede passage of electrical wires therethrough. A method of making a plastic article according to this invention is a novel alternative to forming an internal conduit for electrical wires in a lever by drilling holes in a steel rod of the lever and in a plastic hand grip molded on the steel rod.

SUMMARY OF THE INVENTION

This invention is a new and improved method of making a plastic article having an internal conduit for electrical wires including the steps of forming in a molding apparatus a mold cavity in the shape of the plastic article having a surface area segment defining a passage between a first site in the mold cavity corresponding to a first site on the plastic article and a second site in the mold cavity corresponding to a second site on the plastic article, injecting hot liquid plastic into the mold cavity which is quenched by the surface area segment of the mold cavity to form a solidified tubular wall in the passage having liquid plastic therein, injecting gas at the first site in the mold cavity into the liquid plastic in the tubular wall to expel liquid plastic from within the tubular wall at the second site in the mold cavity so that a gas-filled elongated void is formed within the tubular wall, sustaining the gas-filled elongated void for a time span of sufficient duration for all of the liquid plastic in the mold cavity to solidify to a self-sustaining rigidity and then relieving the gas pressure and removing the plastic article from the molding apparatus, and drilling or otherwise machining the plastic article at each of the first site and the second site thereon for access to the elongated void so that the elongated void defines an internal conduit in the plastic article for an electrical wire. In a preferred embodiment of the method according to this invention, the plastic article is a hand grip of a lever on a steel rod of the lever and the internal conduit extends between a first site in a socket in the hand grip and a second site at an end of the hand grip near a base of the steel rod.

BRIEF DESCRIPTION OF THE DRAWINGS

FIG. 1 is a perspective view of a lever consisting of a steel rod and a plastic hand grip having an internal conduit for

Figure 1:
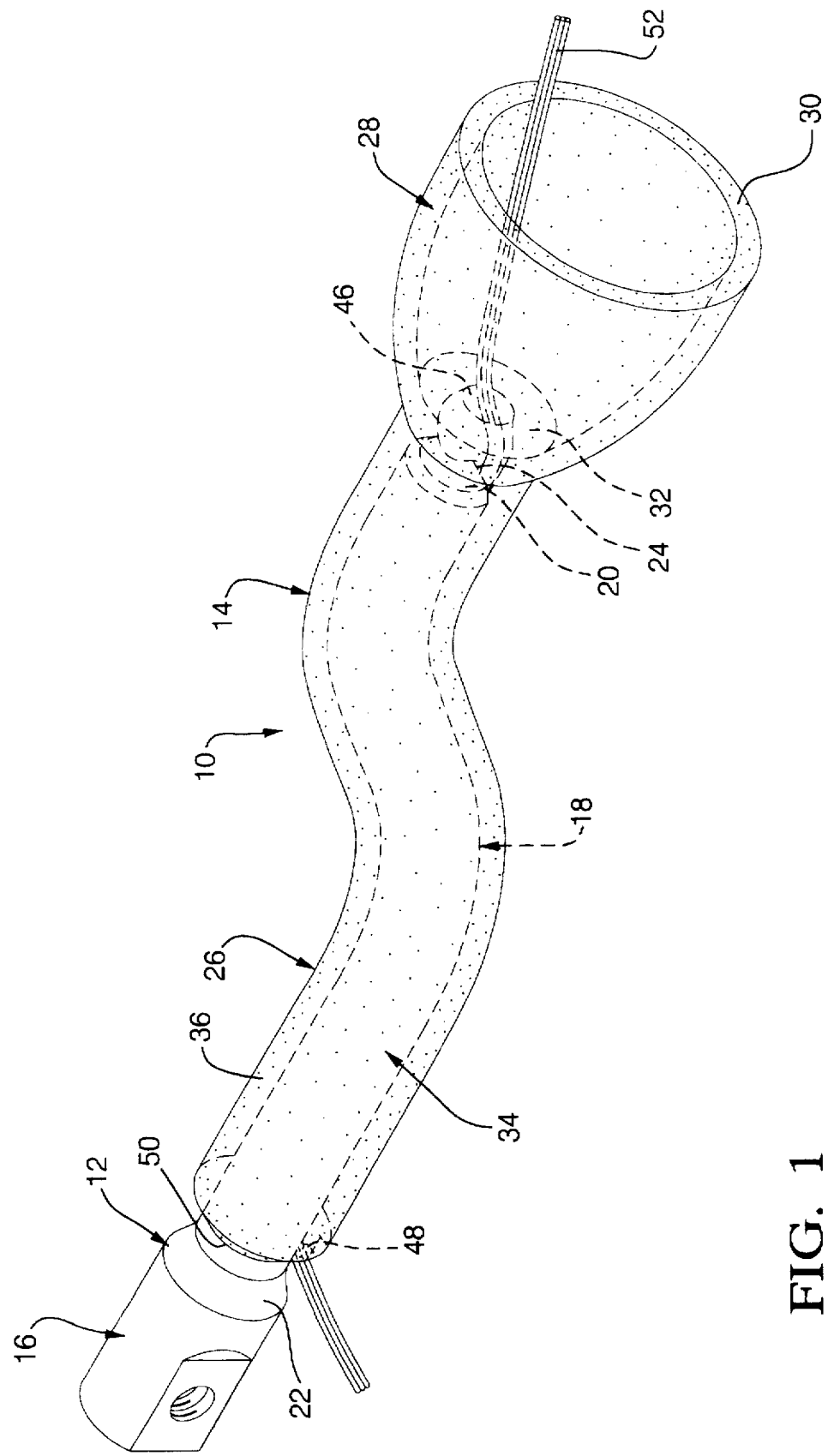
Figure 5A:
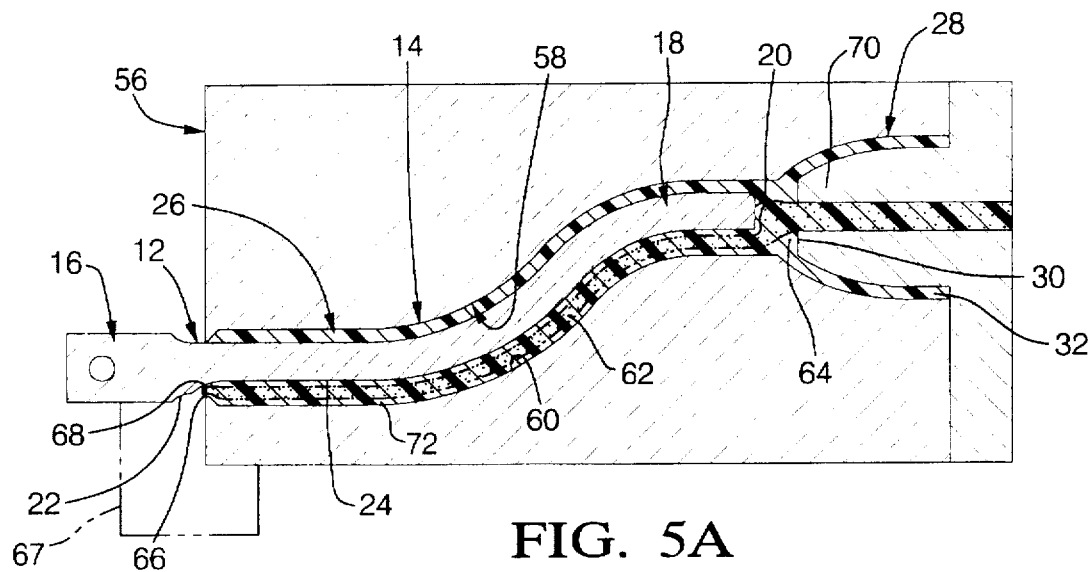
Figure 5B:
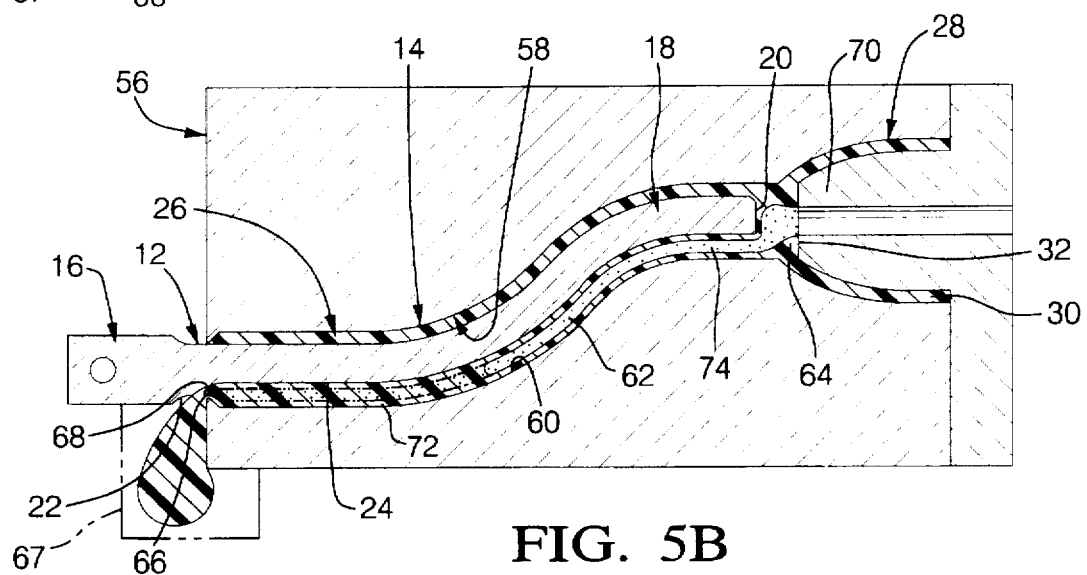
Figure 5C:
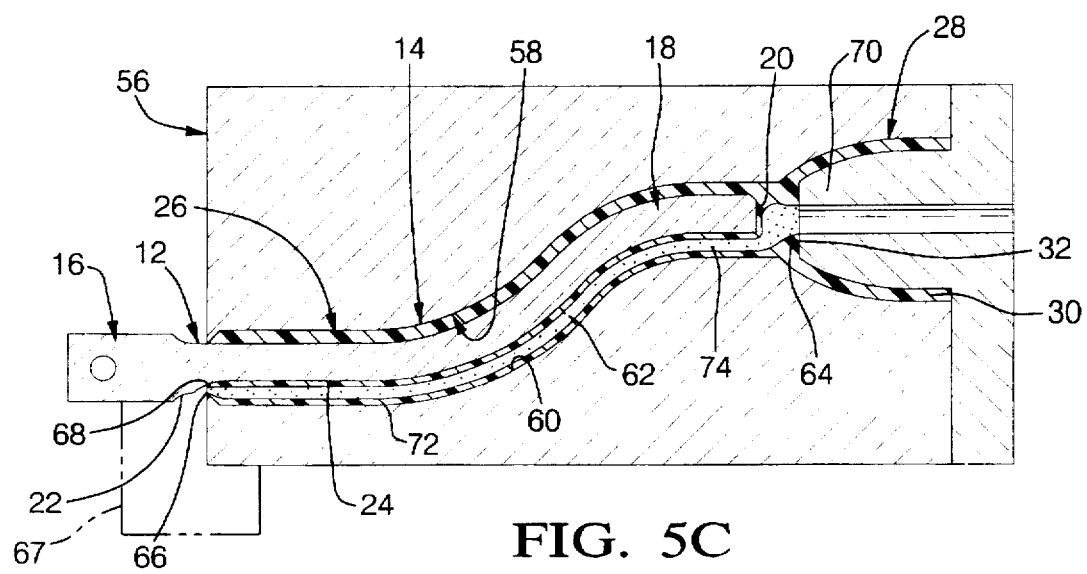

2 electrical wires and made by a method of making a plastic article according to this invention;

FIG. 2 is a sectional view taken generally along the plane indicated by lines 2—2 in FIG. 1;

FIG. 3 is a sectional view taken generally along the plane indicated by lines 3—3 in FIG. 2;

FIG. 4 is similar to FIG. 3 but showing a modified lever in which a plastic hand grip on a metal rod is made by the method according to this invention; and FIGS. 5A–5C are sectional views of a schematic molding apparatus illustrating a plurality of steps of the method according to this invention of making a plastic article having an internal conduit for electrical wires.

DESCRIPTION OF THE PREFERRED EMBODIMENT

Referring to FIGS. 1–4, a generic or representative lever 10 suitable for application, for example, as a transmission control lever on a motor vehicle steering column, not shown, includes a solid steel rod 12 for rigidity and a plastic hand grip 14 made by a method according to this invention for operator comfort and for aesthetics. The steel rod has a cylindrical base 16 and a shank 18 bent to an S-shape contour dictated by space available where the lever is mounted. The shank 18 has an outboard end 20, an inboard end at an annular shoulder 22 between the shank and the cylindrical base 16, and a flat side 24 from its outboard end 20 to the annular shoulder 22. The cylindrical base 16 is flattened where the lever is attached to another element, e.g., a rotatable shift bowl of a motor vehicle steering column.

The plastic hand grip 14 has a tubular body 26 around the shank 18 of the steel rod 12 and an integral socket 28 beyond the outboard end 20 of the shank. The socket 28 has an open end 30 and a bottom 32. A wall 34 of the tubular body 26 has an outer surface 36 concentric with a longitudinal centerline 38 of the shank 18 of the steel rod and an inner surface 40 which conforms to the shape of the shank so that the wall 34 of the tubular body includes a lobe 42 facing the flat side 24 of the shank, the depth or thickness of which exceeds the depth or thickness of the wall 34 facing the remainder of the shank.

A switch, not shown, for an accessory of the motor vehicle, e.g., a windshield wiper motor, is mounted in the socket 28 and conveniently accessible through the open end 30 thereof. An internal conduit 44, FIGS. 2–3, in the lobe 42 of the plastic hand grip 14 in the tubular body 26 thereof is open at one end at a first site 46 on the plastic hand grip in the bottom 32 of the socket 30 behind the aforesaid switch therein and at a second site 48 in an end 50 of the wall 34 of the plastic hand grip facing the annular shoulder 22 on the cylindrical base 16 of the steel rod. A plurality of schematically represented electrical wires 52 in the internal conduit 44 connect the switch in the socket with a wiring harness, not shown, near the cylindrical base 16 of the steel rod.

In an alternate embodiment, FIG. 4, a shank 18' of a steel rod 12' has a V-shaped notch 54 therein instead of a flat side like the flat side 24 on the shank 18 of the steel rod 12. A lobe 42' of a wall 34' of a plastic hand grip 14' on the rod 12' facing the V-shaped notch 54 has a depth or thickness which exceeds the depth or thickness of the wall 34' facing the remainder of the surface of the shank 18'. An internal conduit 44' in the lobe 42' between first and second sites, not shown, on the plastic hand grip 14' has a plurality of electrical wires 52' therein corresponding to the electrical wires 52 in the internal conduit 44 in the plastic handle 14 on the lever 10.

Referring to FIGS. 5A–5C, a first step in the method according to this invention of making the plastic hand grip 14 includes mounting the S-shape contoured shank 18 of the steel rod 12 in a schematically represented mold 56 of a gas-assisted injection molding apparatus, not shown, so that the mold surrounds the shank 18 and cooperates therewith in defining a mold cavity 58 having the shape of the hand grip 14. A surface area segment 60 of the mold cavity 58 faces the flat side 24 of the shank 18, or the V-shaped notch 54 in the shank 18' of the steel rod of the modified embodiment depicted in FIG. 4, and cooperates therewith in defining a passage 62 in the mold cavity 58 having the shape of the lobe 42 and extending from a first site 64 in the cavity corresponding to the first site 46 on the hand grip 14 to a second site 66 in the cavity corresponding to the second site 48 on the hand grip 14. The passage 62 in the mold cavity 58 is open to a schematically represented overflow container 67 outside of the mold cavity through a restricted orifice 68 at the second site 66 in the mold cavity.

In a second step of the method according to this invention, liquid plastic, such as polypropylene, available from Himont USA, Inc., Wilmington, Del., is injected into the mold cavity 58 at the first site 64 in the latter through a nozzle 70. The temperature of the liquid plastic exceeds the temperature of at least the surface area segment 60 of the mold cavity and the flat side 24 of the shank 18 defining the passage 62 so that the liquid plastic in the passage 62 is quenched by the relatively cooler surface area segment 60 and flat side 24, i.e., commences cooling and solidification first where it contacts the surface area segment and the flat side. The quenched liquid plastic solidifies as a tubular wall 72, FIG. 5A, in the passage 62 in the mold cavity 58 having liquid plastic therein.

In a third step of the method according to this invention, gas, e.g. nitrogen, is injected into the mold cavity 58 through the nozzle 70 at the first site 64 in the mold cavity. The pressure of the injected gas induces a pressure gradient across the orifice 68 at the second site 66 in the mold cavity so that liquid plastic from inside the tubular wall 72 in the passage 62 is expelled from the mold cavity through the orifice 68. At the same time, the expelled liquid plastic is replaced by an elongated gas-filled void 74, FIG. 5B, within the tubular wall 72 which expands longitudinally from the first site 64 in the mold cavity toward the second site 66. Importantly, longitudinal expansion of the gas-filled void 74 produces a smooth surface on the tubular wall 72 facing the void. Injection of gas into the liquid plastic in the tubular wall 72 continues until the gas-filled void 74 is substantially as long as the tubular wall 72, FIG. 5C.

A fourth step of the method according to this invention consists of sustaining the gas in the elongated gas-filled void 74 for a time span of sufficient duration for all of the liquid plastic in the mold cavity 58 to achieve solidification corresponding to the plastic hand grip 14 having self-sustaining rigidity outside of the mold 56. At the conclusion of such time span, the gas pressure is relieved and the steel rod 12 with the plastic hand grip 14 thereon is removed from the mold.

A final step of the method according to this invention consists of opening opposite ends of the elongated void 74 by drilling or otherwise machining the plastic hand grip 14 at the first and the second sites 46, 48 thereon to provide access to the smooth-walled elongated void 74 in the lobe 42 of the plastic hand grip whereby the elongated void is converted into the internal conduit 44 of the plastic hand grip open at both ends. The size of the accesses to the internal conduit at the first and the second sites 46, 48 afforded by such drilling is calculated to achieve easy entry of the electrical wires 52. Importantly, the aforesaid smooth-walled characteristic of the elongated void 74 maximizes the ease with which the wires are guided by the internal conduit 44 from the one of the first and the second sites 46, 48 where the wires are introduced into the internal conduit to the other of the first and the second sites where the wires exit from the internal conduit.

It will be apparent to those skilled in the art that the method according to this invention of making a plastic article having an internal conduit for electrical wires has application to a wide variety of plastic articles beyond a plastic hand grip on a steel rod of a lever. For example, a molded plastic panel defining a side of a motor vehicle door facing a passenger compartment of the motor vehicle may have a plurality of switches thereon for electric windows, electric locks and the like, all of which are connected to a wiring harness of the motor vehicle through electrical wires. By employing the method according to this invention to make such plastic panels, internal conduits are provided on the panels between the switch sites and a convenient site whereat electrical wires in the internal conduits may be connected to the wiring harness.

Having thus described the invention, what is claimed is:

1. A method of making a plastic hand grip on a steel rod having an internal conduit in said hand grip for an electrical wire between a first site on said hand grip and a second site on said hand grip comprising the steps of:

forming a mold cavity in the shape of said hand grip around a portion of said steel rod including a surface area segment of said mold cavity cooperating with a surface on said rod in defining a passage between a first site in said mold cavity corresponding to said first site on said hand grip and a second site in said mold cavity corresponding to said second site on said hand grip, forming an orifice between said mold cavity at said second site therein and an overflow receiver, injecting into said mold cavity liquid plastic at a temperature above the temperature of said surface area segment of said mold cavity and of said surface on said rod so that said liquid plastic is quenched by said surface area segment of said mold cavity and said surface on said rod to form a tubular wall in said passage in said mold cavity having liquid plastic therein, injecting gas into said mold cavity at said first site therein to induce a pressure gradient across said orifice between said mold cavity and said overflow receiver so that liquid plastic is expelled from said mold cavity through said orifice and an elongated gas-filled void expands longitudinally in said tubular wall to substantially said length thereof and forms a smooth surface on said tubular wall facing said elongated gas-filled void, sustaining said elongated gas-filled void in said tubular wall for a time span of sufficient duration for all of said liquid plastic in said mold cavity to solidify to a self-sustaining rigidity, relieving said gas pressure in said elongated void and removing said steel rod with said plastic hand grip thereon from said mold cavity, and opening a first end and a second end of said elongated void at respective ones of said first site and said second site on said plastic hand grip to convert said elongated void to an internal conduit for said electrical wire.

2. The method of making a plastic hand grip on a steel rod recited in claim 1 further comprising the step of:

forming said mold cavity to define a socket on said plastic hand grip for an electrical switch with said first site on said hand grip being in a bottom of said socket.

3. The method of making a plastic hand grip on a steel rod recited in claim 1 wherein:

said surface on said steel rod cooperating with said surface area segment of said mold cavity in defining a passage between said first site in said mold cavity corresponding to said first site on said plastic hand grip and said second site in said mold cavity corresponding to said second site on said plastic hand grip is a flat surface parallel to a longitudinal centerline of said steel rod.

4. The method of making a plastic hand grip on a steel rod recited in claim 1 wherein:

said surface on said steel rod cooperating with said surface area segment of said mold cavity in defining a passage between said first site in said mold cavity corresponding to said first site on said plastic hand grip and said second site in said mold cavity corresponding to said second site on said plastic hand grip is constituted by a V-shaped notch in said steel rod parallel to a longitudinal centerline of said steel rod.

* * * * *